(12) United States Patent
Dunivan

(10) Patent No.: US 11,498,138 B2
(45) Date of Patent: Nov. 15, 2022

(54) BANDSAW AUTOMATED PORTIONING SAW SYSTEM AND METHOD OF USE

(71) Applicant: Steve Dunivan, Amarillo, TX (US)

(72) Inventor: Steve Dunivan, Amarillo, TX (US)

(*) Notice: Subject to any disclaimer, the term of this patent is extended or adjusted under 35 U.S.C. 154(b) by 141 days.

(21) Appl. No.: 16/751,100

(22) Filed: Jan. 23, 2020

(65) Prior Publication Data

US 2020/0230722 A1     Jul. 23, 2020

Related U.S. Application Data

(60) Provisional application No. 62/796,027, filed on Jan. 23, 2019.

(51) Int. Cl.
*B23D 55/04*     (2006.01)
*A22C 17/00*     (2006.01)

(52) U.S. Cl.
CPC .......... *B23D 55/046* (2013.01); *A22C 17/002* (2013.01)

(58) Field of Classification Search
CPC ........ B23D 55/046; A22C 17/002; B26D 1/56
See application file for complete search history.

(56) References Cited

U.S. PATENT DOCUMENTS

| | | | | |
|---|---|---|---|---|
| 1,499,124 A | * | 6/1924 | Reichmann | B23D 55/046 83/421 |
| 3,832,929 A | * | 9/1974 | Pedi | B23D 55/10 83/714 |
| 4,442,741 A | * | 4/1984 | Whittingham | B26D 1/547 83/110 |
| 4,534,085 A | * | 8/1985 | Stewart | A22C 25/16 452/161 |
| 4,583,435 A | * | 4/1986 | Fessler | B26D 7/01 83/277 |
| 5,117,717 A | * | 6/1992 | Maliy | B26D 5/20 53/157 |
| 5,324,228 A | * | 6/1994 | Vogeley, Jr. | A22C 17/0086 452/150 |
| 5,364,302 A | * | 11/1994 | Shibata | A22C 7/00 452/174 |

(Continued)

FOREIGN PATENT DOCUMENTS

| | | | | |
|---|---|---|---|---|
| CA | 2511345 A1 | * | 7/2004 | ............... B26D 7/30 |
| CA | 2947594 A1 | * | 5/2017 | ........... B23D 55/043 |

(Continued)

*Primary Examiner* — Sean M Michalski
(74) *Attorney, Agent, or Firm* — Shannon Warren

(57) ABSTRACT

An automated saw for assessing an uncut meat and calculating one or more of a cut depth and cutting one or more cut portions. The automated saw comprises a bandsaw blade, a controller, a visual sensor and a meat positioning assembly. The controller comprises a computer comprising an address space, and a processor, a memory. The controller stores a device application in the memory and runs the device application on the processor. The meat positioning assembly comprises a pusher and a tray configured to move the uncut meat relative to the bandsaw blade. The tray is configured to hold the uncut meat. The pusher is configured to slide the uncut meat through the tray. The meat positioning assembly is configured to move the tray in a forward direction and a rearward direction relative to the bandsaw blade.

6 Claims, 12 Drawing Sheets

(56) References Cited

U.S. PATENT DOCUMENTS

| | | | | |
|---|---|---|---|---|
| 5,482,166 A * | 1/1996 | Brown | A22C 17/002 | 209/939 |
| 5,492,502 A * | 2/1996 | Hjorth | A22C 25/142 | 452/170 |
| 5,974,925 A * | 11/1999 | Lindee | B26D 1/0006 | 83/403.1 |
| 6,070,509 A * | 6/2000 | Lonn | B26D 1/62 | 83/318 |
| 6,152,004 A * | 11/2000 | Nispel | B26D 7/32 | 83/155 |
| 6,640,681 B1 * | 11/2003 | Weber | B26D 7/18 | 83/27 |
| 6,935,215 B2 * | 8/2005 | Lindee | B26D 7/0683 | 83/74 |
| 7,073,419 B2 * | 7/2006 | Weber | B26D 7/01 | 83/14 |
| 7,603,936 B2 * | 10/2009 | Pryor | B26D 7/01 | 83/277 |
| 7,621,806 B2 * | 11/2009 | Bottemiller | A22C 17/008 | 452/150 |
| 8,408,108 B2 * | 4/2013 | Redemann | B26D 1/143 | 83/356 |
| 8,893,599 B2 * | 11/2014 | Reifenhaeuser | B26D 7/32 | 83/23 |
| 9,764,490 B2 * | 9/2017 | Weber | B26D 7/30 | |
| 9,950,869 B1 * | 4/2018 | Pryor | B65G 23/44 | |
| 9,981,400 B2 * | 5/2018 | Dreier | B65H 35/08 | |
| 10,160,602 B2 * | 12/2018 | Torrenga | B65G 15/12 | |
| 10,639,798 B2 * | 5/2020 | Pryor | B26D 7/01 | |
| 10,703,001 B2 * | 7/2020 | Einloft-Velte | B65H 20/32 | |
| 10,751,899 B2 * | 8/2020 | Lischinski | B26D 1/143 | |
| 10,751,900 B2 * | 8/2020 | Einloft-Velte | B65H 35/08 | |
| 10,829,335 B2 * | 11/2020 | Gerhardt | B65G 20/02 | |
| 2002/0083816 A1 * | 7/2002 | Krauss | B26D 7/01 | 83/932 |
| 2003/0145700 A1 * | 8/2003 | Lindee | B26D 7/32 | 83/29 |
| 2003/0221532 A1 * | 12/2003 | Long | B23D 55/046 | 83/651 |
| 2005/0085176 A1 * | 4/2005 | Houtz | A22C 17/0086 | 452/157 |
| 2005/0132855 A1 * | 6/2005 | Weber | B26D 9/00 | 83/155 |
| 2005/0132863 A1 * | 6/2005 | Biggs | A22C 17/0013 | 83/788 |
| 2006/0156878 A1 * | 7/2006 | Faires | B65G 47/31 | 83/13 |
| 2007/0157776 A1 * | 7/2007 | Sorensen | A22C 17/0086 | 83/23 |
| 2009/0145272 A1 * | 6/2009 | Sandberg | B26D 7/18 | 83/13 |
| 2010/0206143 A1 * | 8/2010 | Lin | B23D 55/046 | 82/127 |
| 2011/0126680 A1 * | 6/2011 | Weber | B26D 7/2635 | 83/13 |
| 2012/0167730 A1 * | 7/2012 | Schaub | B26D 7/32 | 83/39 |
| 2013/0139664 A1 * | 6/2013 | Diehr | B26D 7/01 | 83/37 |
| 2014/0356086 A1 * | 12/2014 | Hirko | B23B 41/02 | 408/69 |
| 2015/0205288 A1 * | 7/2015 | Strong | A22C 17/002 | 700/114 |
| 2017/0165858 A1 * | 6/2017 | Bochtler | B26D 7/0683 | |
| 2017/0266831 A1 * | 9/2017 | Wachter | B26D 7/0625 | |
| 2017/0368707 A1 * | 12/2017 | Keller | B26D 7/0633 | |
| 2018/0111283 A1 * | 4/2018 | Klockow | B26D 7/2614 | |
| 2018/0169888 A1 * | 6/2018 | Weber | B26D 7/0616 | |
| 2018/0186022 A1 * | 7/2018 | Fox | A22C 17/002 | |
| 2019/0061027 A1 * | 2/2019 | Stolzer | B23D 55/088 | |
| 2019/0232513 A1 * | 8/2019 | Erne | B26D 7/0616 | |
| 2019/0281843 A1 * | 9/2019 | Volkl | B26D 7/01 | |
| 2020/0288729 A1 * | 9/2020 | Blaine | G05B 17/02 | |
| 2020/0315191 A1 * | 10/2020 | Hofmann | A22C 17/0093 | |
| 2021/0227840 A1 * | 7/2021 | Blaine | A22C 17/002 | |

FOREIGN PATENT DOCUMENTS

| | | | | |
|---|---|---|---|---|
| DE | 102017112177 A1 * | 12/2018 | | B26D 3/161 |
| EP | 3238898 A1 * | 11/2017 | | B26D 7/01 |
| EP | 3831559 A1 * | 6/2021 | | A22C 7/0046 |
| WO | WO-0013864 A1 * | 3/2000 | | B23D 55/046 |

* cited by examiner

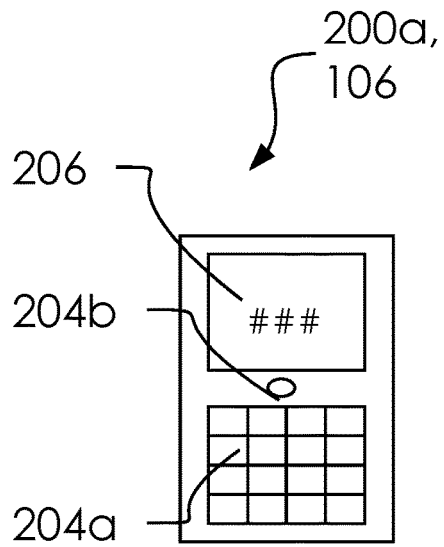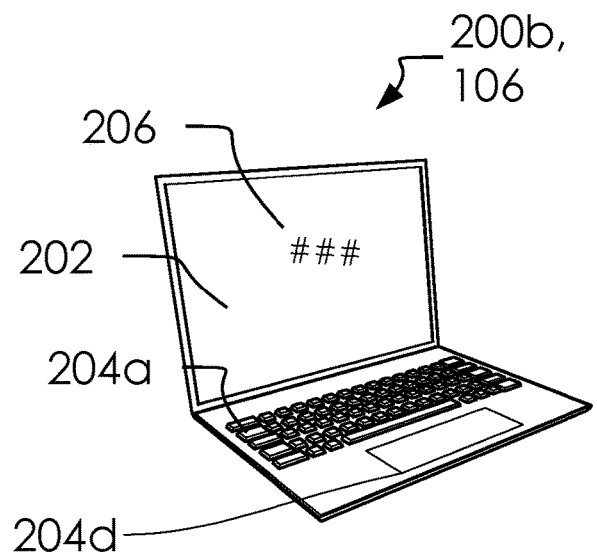
FIG. 2A  FIG. 2B
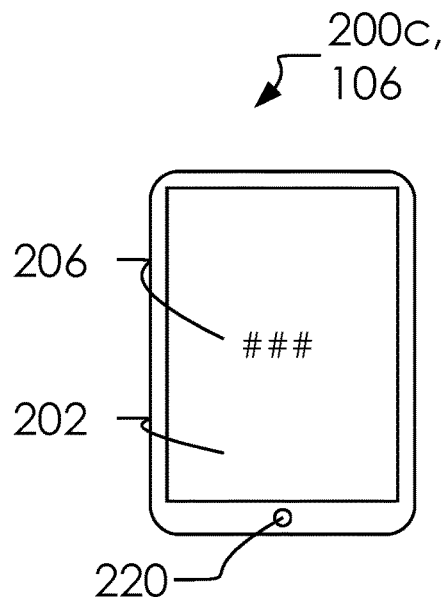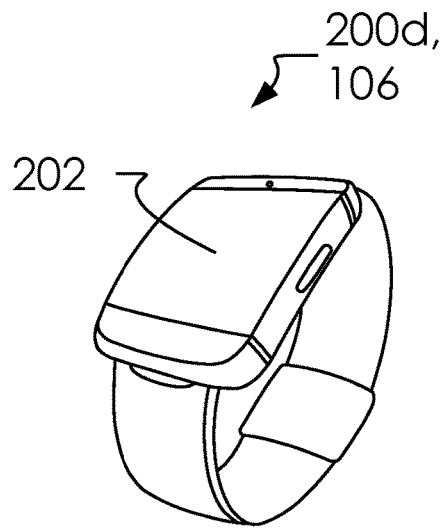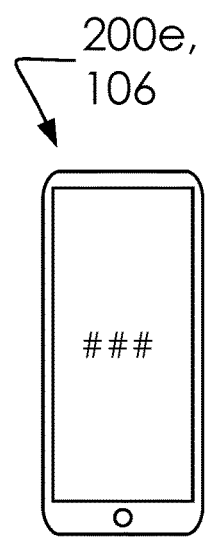
FIG. 2C  FIG. 2D  FIG. 2E

BANDSAW AUTOMATED PORTIONING SAW SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant

BRIEF SUMMARY OF THE INVENTION

An automated saw for assessing an uncut meat and calculating one or more of a cut depth and cutting one or more cut portions. Said automated saw comprises a bandsaw blade, a controller, a visual sensor and a meat positioning assembly. Said meat positioning assembly comprises a pusher and a tray configured to move said uncut meat relative to said bandsaw blade. Said tray is configured to hold said uncut meat. Said pusher is configured to slide said uncut meat through said tray. Said meat positioning assembly is configured to move said tray in a forward direction and a rearward direction relative to said bandsaw blade. Said uncut meat comprises a first end and a second end. Said first end of said uncut meat comprises a surface area and a diameter. Said uncut meat comprises an uncut meat weight. Said one or more cut portions comprise at least a first cut portion of said uncut meat. Said controller is configured for calculating a fraction comprising a cut portion weight divided by said uncut meat weight and multiplying said fraction with an uncut meat length to determine said cut depth, activating said meat positioning assembly to align a cutting plane at said cut depth from said first end, cutting said first cut portion from said uncut meat with said bandsaw blade, and repeating these steps as required to separate said one or more cut portions from said uncut meat.

BRIEF DESCRIPTION OF THE SEVERAL VIEWS OF THE DRAWING

FIGS. 2A, 2B, 2C, 2D and 2E illustrate a mobile phone 200a, a personal computer 200b, a tablet 200c, a smart watch 200d and a smart phone 200e, respectively.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
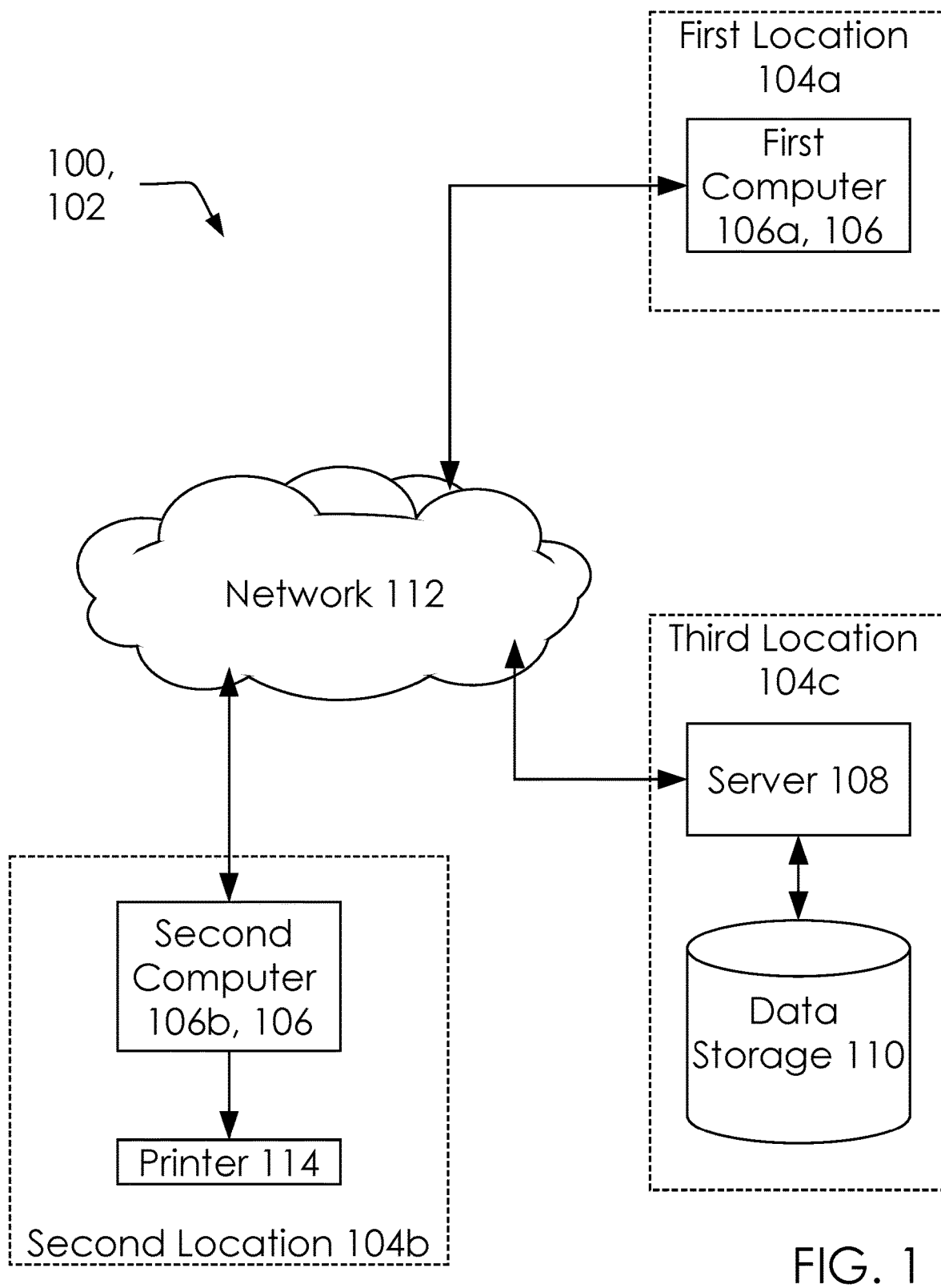
FIG. 1 illustrates a network diagram 102.

FIG. 1 illustrates a network diagram 102.

In one embodiment, said network diagram 102 can comprise one or more computers 106, one or more locations 104, and a network 112. In one embodiment, said one or more locations 104 can comprise a first location 104a, a second location 104b and a third location 104c. Said one or more computers 106 can comprise a first computer 106a, a second computer 106b, a wearable computer 106c, a wearable computer 106d and a third computer 106e. In one embodiment, a server 108 can communicate with said one or more computers 106 over said network 112. Said one or more computers 106 can be attached to a printer 114 or other accessories, as is known in the art.

In one embodiment, said server 108 can attach to a data storage 110.

In one embodiment, said printer 114 can be hardwired to said first computer 106a (not illustrated here), or said printer 114 can connect to one of said one or more computers 106 (such as said second computer 106b, as illustrated) via said network 112.

Said network 112 can be a local area network (LAN), a wide area network (WAN), a piconet, or a combination of LANs, WANs, or piconets. One illustrative LAN is a network within a single business. One illustrative WAN is the Internet.

In one embodiment, said server 108 represents at least one, but can be many servers, each connected to said network 112. Said server 108 can connect to said data storage 110. Said data storage 110 can connect directly to said server 108, as shown in FIG. 1, or may exist remotely on said network 112. In one embodiment, said data storage 110 can comprise any suitable long-term or persistent storage device and, further, may be separate devices or the same device and may be collocated or distributed (interconnected via any suitable communications network).

FIGS. 2A, 2B, 2C, 2D and 2E illustrate a mobile phone 200a, a personal computer 200b, a tablet 200c, a smart watch 200d and a smart phone 200e, respectively.

In one embodiment, said one or more computers 106 can comprise said mobile phone 200a, said personal computer 200b, said tablet 200c, said smart watch 200d or said smart phone 200e. In one embodiment, each among said one or more computers 106 can comprise one or more input devices 204, a keyboard 204a, a trackball 204b, one or more cameras 204c, a track pad 204d, a data 206 and/or a home button 220, as is known in the art.

In the last several years, the useful definition of a computer has become more broadly understood to include mobile phones, tablet computers, laptops, desktops, and similar. For example, Microsoft®, have attempted to merge devices such as a tablet computer and a laptop computer with the release of "Windows® 8". In one embodiment, said one or more computers each can include, but is not limited to, a laptop (such as said personal computer 200b), desktop, workstation, server, mainframe, terminal, a tablet (such as said tablet 200c), a phone (such as said mobile phone 200a), and/or similar. Despite different form-factors, said one or more computers can have similar basic hardware, such as a screen 202 and said one or more input devices 204 (such as said keyboard 204a, said trackball 204b, said one or more cameras 204c, a wireless—such as RFID—reader, said track pad 204d, and/or said home button 220). In one embodiment, said screen 202 can comprise a touch screen. In one embodiment, said track pad 204d can function similarly to a computer mouse as is known in the art. In one embodiment, said tablet 200c and/or said personal computer 200b can comprise a Microsoft® Windows® branded device, an Apple® branded device, or similar. In one embodiment, said tablet 200c can be an X86 type processor or an ARM type processor, as is known in the art.

Said network diagram 100 can comprise said data 206. In one embodiment, said data 206 can comprise data related to financial transactions.

In one embodiment, said one or more computers can be used to input and view said data 206. In one embodiment, said data 206 can be input into said one or more computers by taking pictures with one of said one or more camera 204c, by typing in information with said keyboard 204a, or by using gestures on said screen 202 (where said screen 202 is a touch screen). Many other data entry means for devices like said one or more computers are well known and herein also possible with said data 206. In one embodiment, said first computer 102a can comprise an iPhone®, a BlackBerry®, a smartphone, or similar. In one embodiment, one or more computers can comprise a laptop computer, a desktop computer, or similar.

Figure 3A:
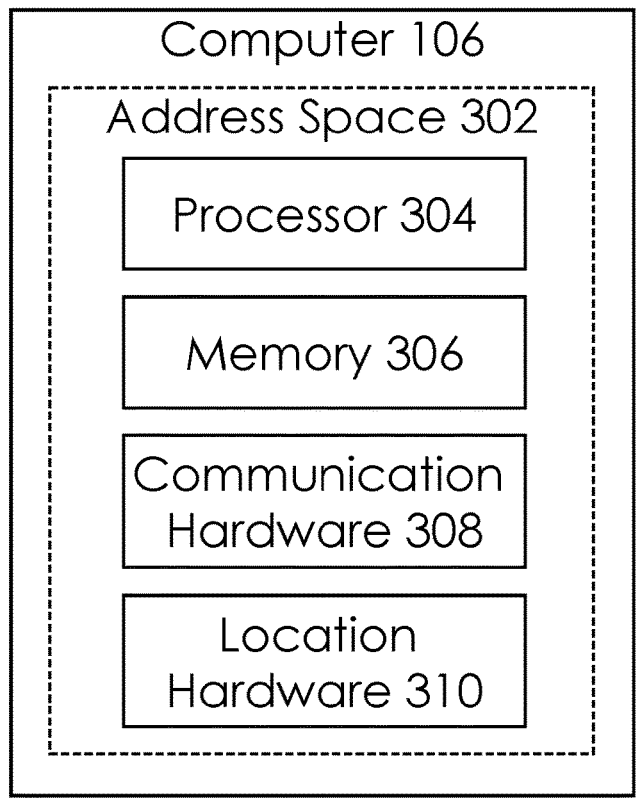
FIGS. 3A, 3B and 3C illustrate an address space 302, an address space 302a and an address space 302e, respectively.
Figure 3B:
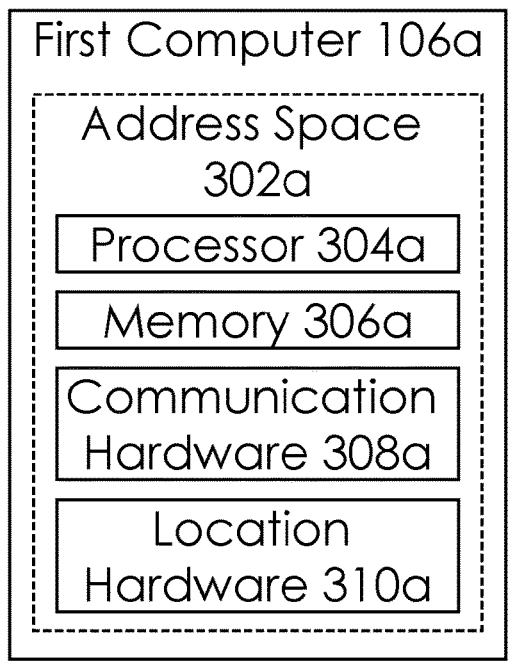
Figure 3C:
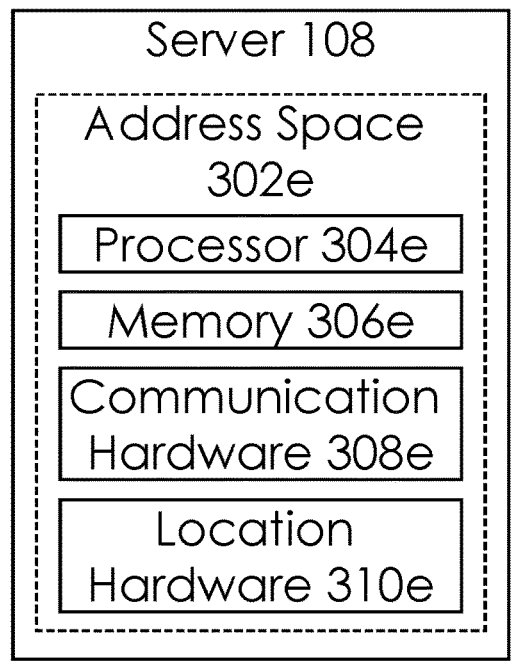

FIGS. 3A, 3B and 3C illustrate an address space 302, an address space 302a and an address space 302e, respectively.

In one embodiment, said one or more computers 106 can comprise said address space 302, and more specifically, said first computer 106a can comprise said address space 302a, said second computer 106b can comprise an address space 302b, said wearable computer 106c can comprise an address space 302c, said wearable computer 106d can comprise an address space 302d; and said server 108 can comprise said address space 302e. In turn, each among said address space 302 can comprise a processor 304, a memory 306, a communication hardware 308 and a location hardware 310.

Thus, said address space 302a a processor 304a, a memory 306a, a communication hardware 308a and a location hardware 310a; said address space 302b can comprise a processor 304b, a memory 306b, a communication hardware 308b and a location hardware 310b; said address space 302c can comprise a processor 304c, a memory 306c, a communication hardware 308c and a location hardware 310c; said address space 302d can comprise a processor 304d, a memory 306d, a communication hardware 308d and a location hardware 310d; and said address space 302e can comprise a processor 304e, a memory 306e, a communication hardware 308e and a location hardware 310e.

Each among said one or more computers 106 and said server 108 can comprise an embodiment of said address space 302. In one embodiment, said processor 304 can comprise a plurality of processors, said memory 306 can comprise a plurality of memory modules. In one embodiment, said data 206 can be sent to said processor 304; wherein, said processor 304 can perform processes on said data 206 according to an application stored in said memory 306, as discussed further below. Said processes can include storing said data 206 into said memory 306, verifying said data 206 conforms to a one or more preset standards, or ensuring a required set among said required said data 206 has been gathered for said data management system and method. In one embodiment, said data 206 can include data which said one or more computers 106 can populate automatically, such as a date and a time, as well as data entered manually. Once a portion of gathering data has been performed said data 206 can be communicated over said network 112. The network can include a network transport processor for packetizing data, communication ports for wired communication, or an antenna for wireless communication. In one embodiment, said data 206 can be collected in one or more computers and delivered to said server 108 through said network 112.

Figure 4A:
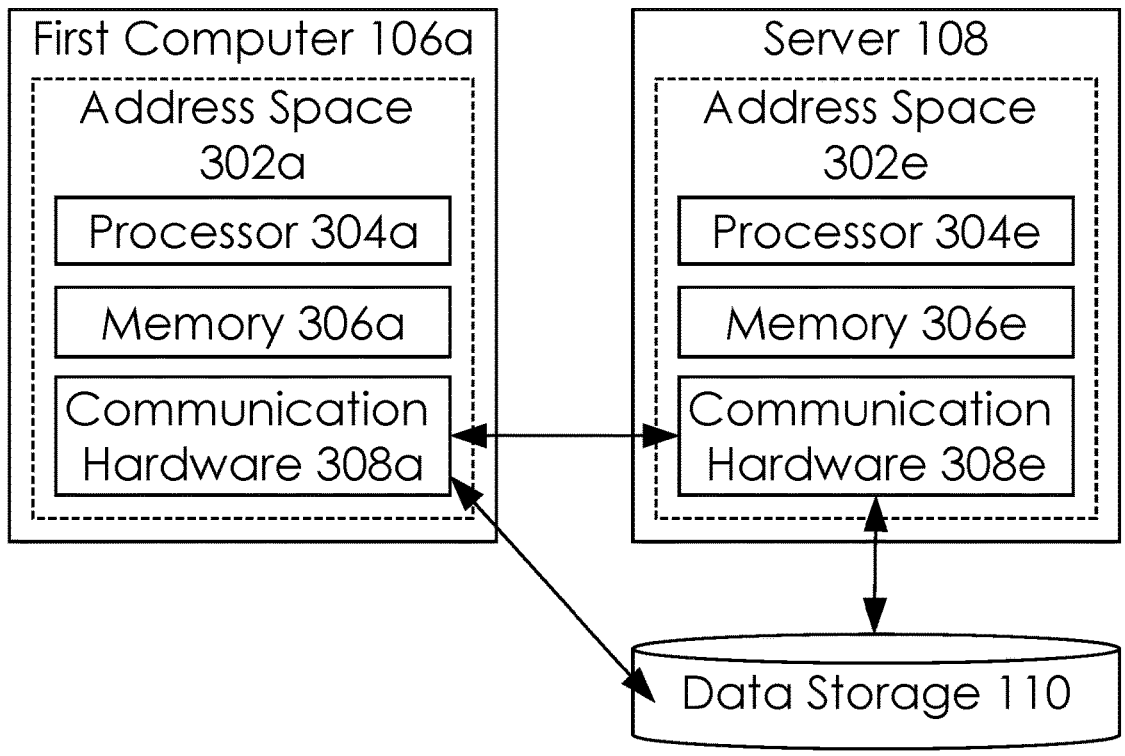
FIGS. 4A and 4B illustrate a flow chart between said one or more computers 106 and said server 108.
Figure 4B:
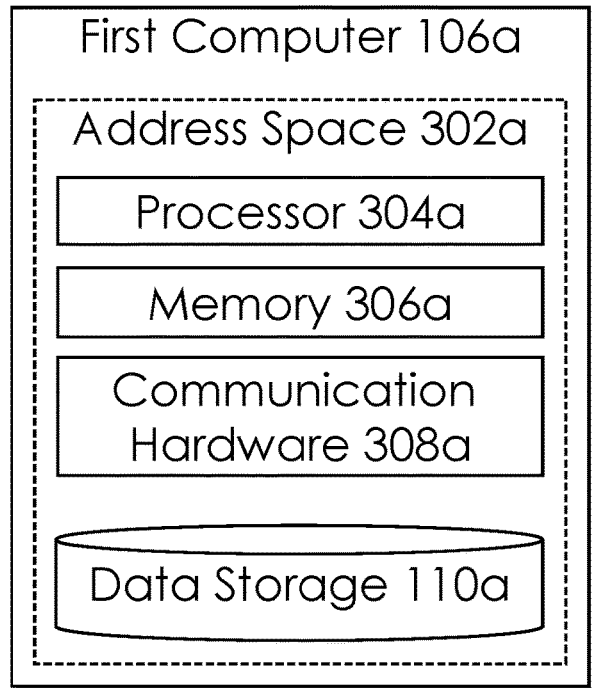

FIGS. 4A and 4B illustrate a flow chart between said one or more computers 106 and said server 108.

In the first embodiment, said communication hardware 308a and said communication hardware 308e can send and receive said data 206 to and from one another and or can communicate with said data storage 110 across said network 112. Likewise, in the second embodiment, said data storage 110 can be embedded inside of said one or more computers 106, which may speed up data communications over said network 112.

As illustrated in FIG. 4A, in one embodiment, said server 108 can comprise a third-party data storage and hosting provider or privately managed as well.

As illustrated in FIG. 4B, a data storage 110a can be located on said first computer 106a. Thus, said first computer 106a can operate without a data connection out to said server 108.

Figure 5A:
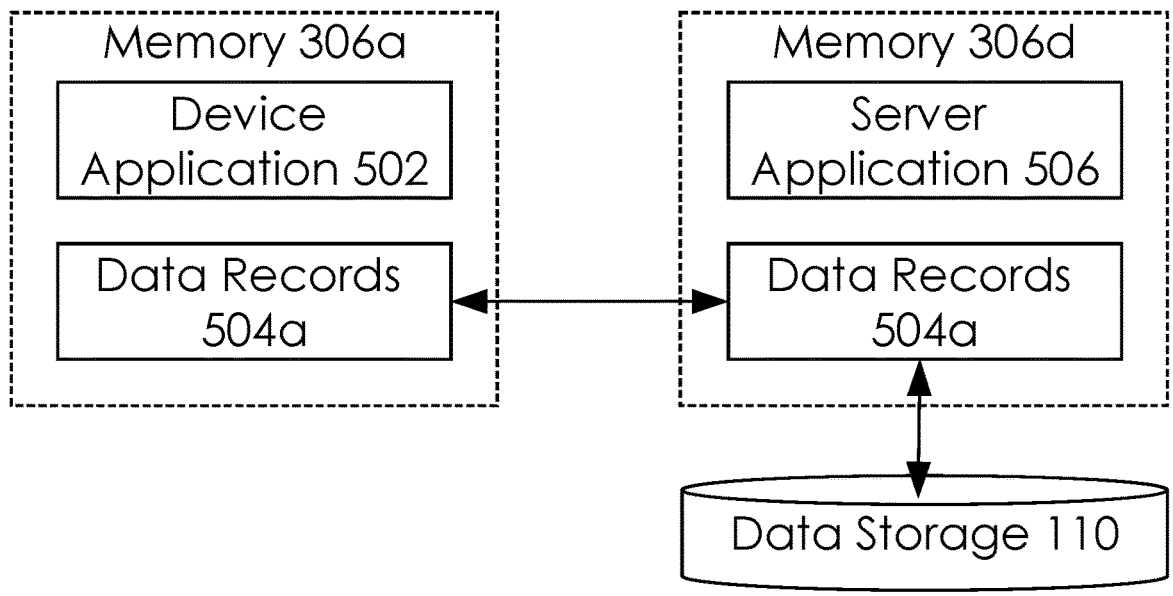
FIGS. 5A and 5B illustrate interactions between a device application 502, a server application 506 and said data storage 110.
Figure 5B:
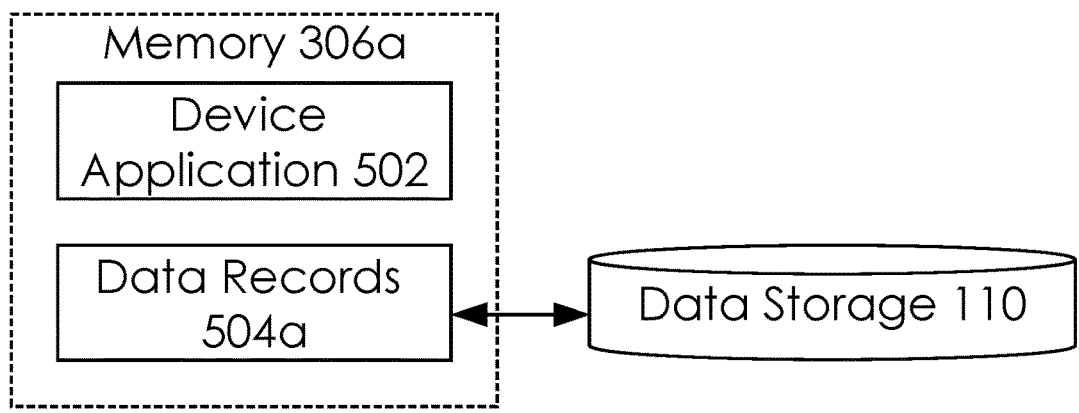

FIGS. 5A and 5B illustrate interactions between a device application 502, a server application 506 and said data storage 110.

For nomenclature, each among data records can comprise a set of data records in use on said one or more computers 106; thus said first computer 106a can comprise a data records 504a, said second computer 106b can comprise a data records 504b, said wearable computer 106c can comprise a data records 504c, and said wearable computer 106d can comprise a data records 504d.

Figure 6:
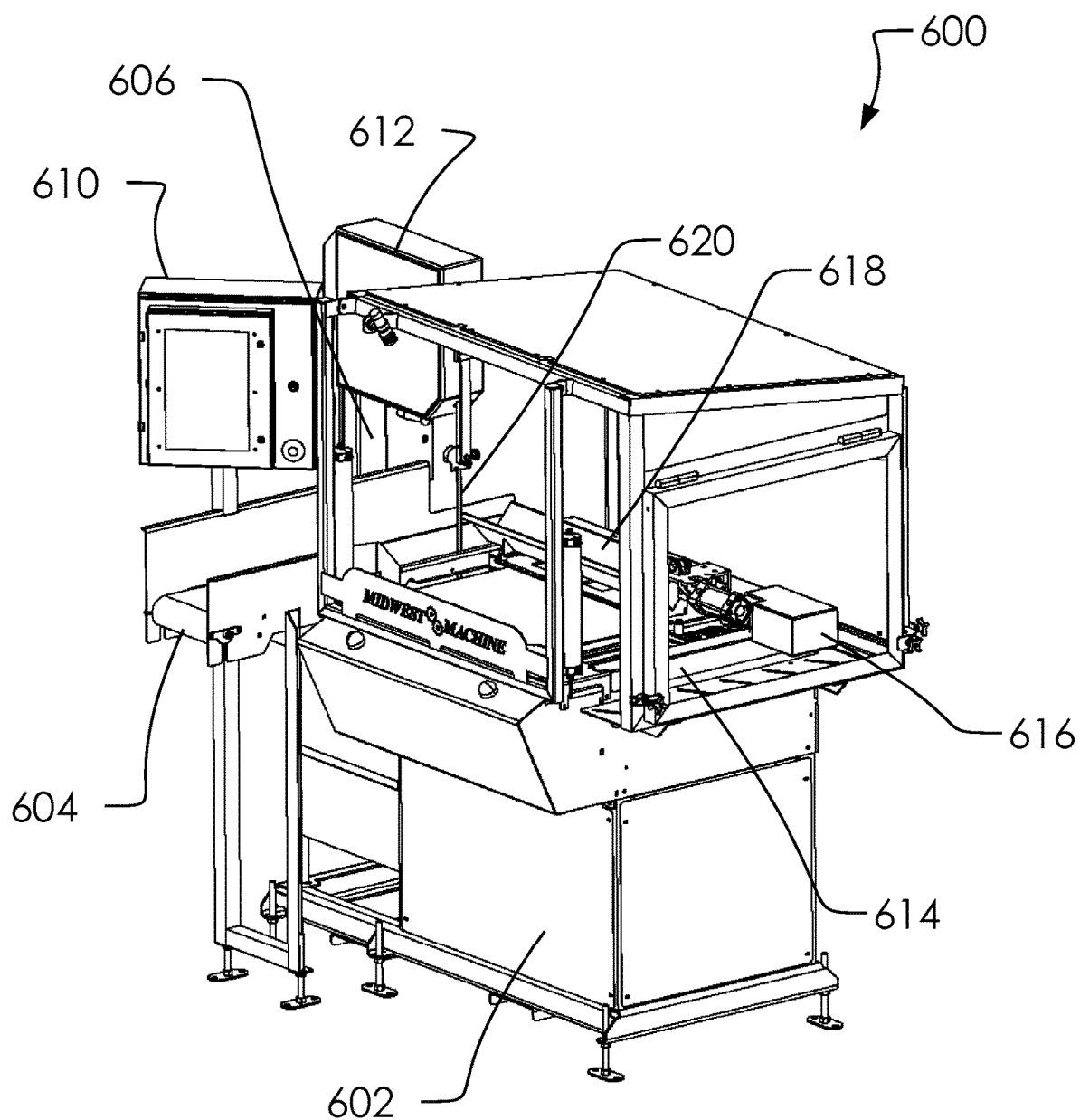
FIG. 6 illustrates a perspective overview of an automated saw 600.

FIG. 6 illustrates a perspective overview of an automated saw 600.

In one embodiment, said automated saw 600 can comprise a base 602, a conveyor 604, a post 606, an overhang portion 608, a controller 610, a visual sensor 612, a meat positioning assembly 614, a pusher 616, a tray 618 and a bandsaw blade 620. Said base 602 can comprise a lower portion of said automated saw 600 which supports said tray 618 and said meat positioning assembly 614. In one embodiment, said meat positioning assembly 614 can comprise a system which moves said tray 618 and said pusher 616 relative to other portions of said automated saw 600. In one embodiment, said conveyor 604 can transport elements having been cut by said bandsaw blade 620, as discussed below. In one embodiment, said visual sensor 612 can comprise a camera, as is known in the art. In one embodiment, said tray 618 can move in two or three axes as dictated by said controller 610.

In one embodiment, said controller 610 can comprise one among said one or more computers 106. In one embodiment, said controller 610 can receive signals from said visual sensor 612, said meat positioning assembly 614, others among said one or more computers 106 and/or said server 108 to determine movement of said meat positioning assembly 614 and movement of said bandsaw blade 620.

Said controller 610 can comprise one among said one or more computers 106 comprising said address space 302, said processor 304, said memory 306 and said communication hardware 308. Said controller 610 can be store said device application 502 in said memory 306 and run said device application 502 on said processor 304 as discussed above and known in the art.

Figure 7:
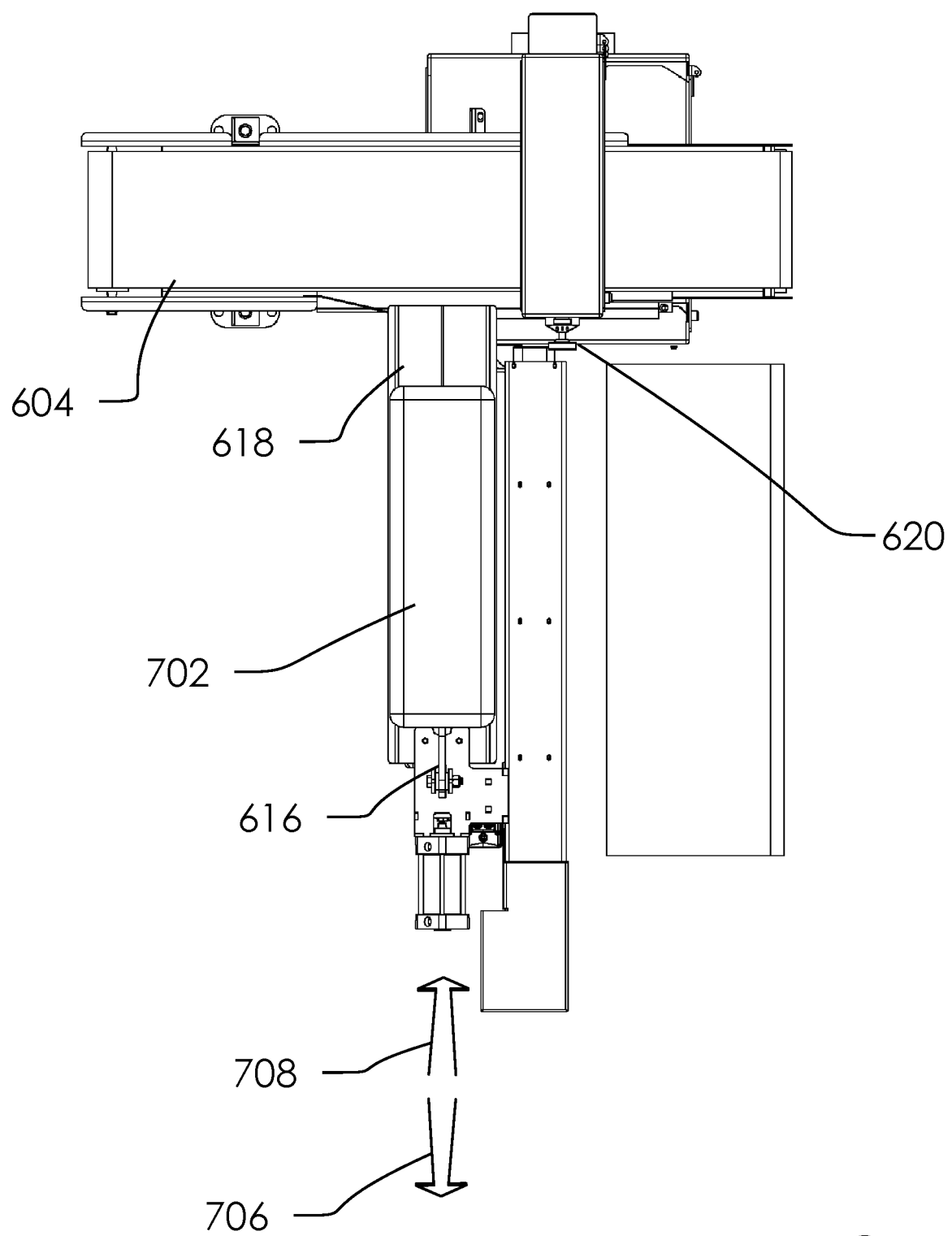
FIG. 7 illustrates an elevated top view of said automated saw 600.

FIG. 7 illustrates an elevated top view of said automated saw 600.

One objective of said automated saw 600 can be to control movement of an uncut meat 702 within a forward direction 708 and a rearward direction 706; with the added control of movement of said uncut meat 702 relative to said tray 618 by pressing said uncut meat 702 with said pusher 616 in said forward direction 708.

Figure 8:
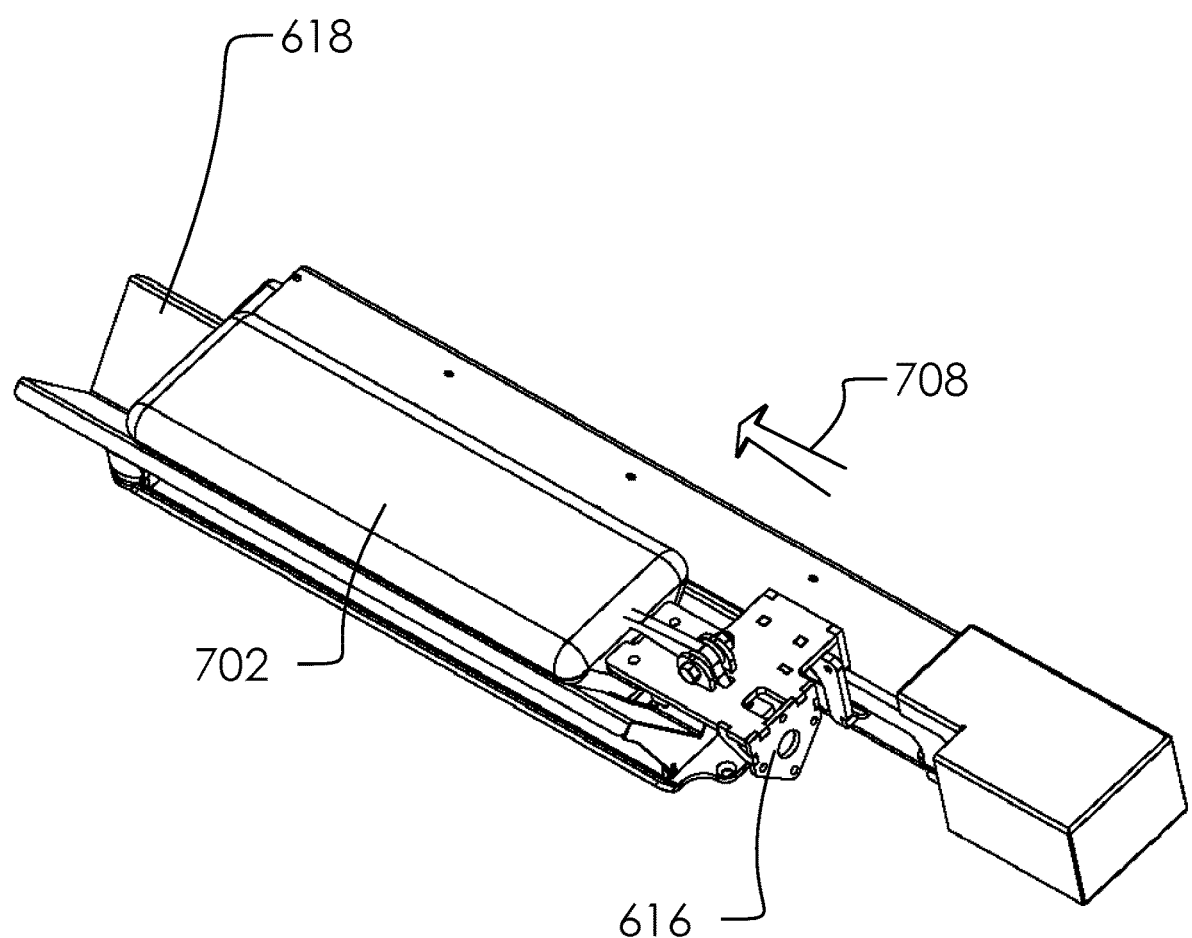
FIG. 8 illustrates an isometric overview of said uncut meat 702 on said tray 618.

FIG. 8 illustrates an isometric overview of said uncut meat 702 on said tray 618.

Figure 9:
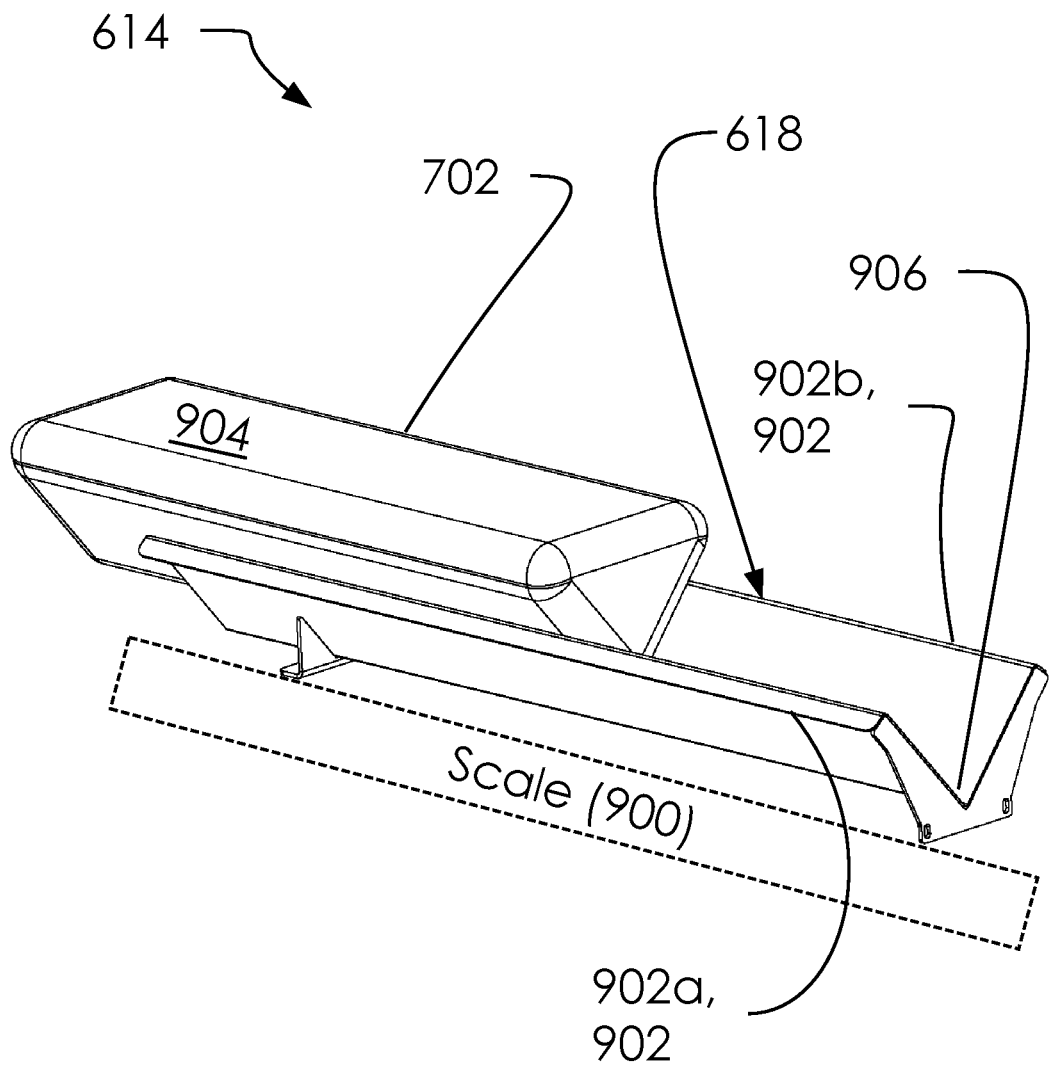
FIG. 9 illustrates a perspective overview of said meat positioning assembly 614 and an uncut meat weight 904.

FIG. 9 illustrates a perspective overview of said meat positioning assembly 614 and an uncut meat weight 904.

In one embodiment, said automated saw 600 can comprise a scale 900. In one embodiment, said controller 610 can communicate with said scale 900 to determine said uncut meat weight 904 of said uncut meat 702 at a given time. In one embodiment, said controller 610 can be configured to calculate said uncut meat weight 904 before and after cutting with said bandsaw blade 620.

In one embodiment, said tray 618 can comprise two sides 902 (which can comprise a first side 902a and a second side 902b). said first side 902a and said second side 902b can be arranged in a "V" shape with a lower join line 906 forming a substantially straight line at the point they meet.

Figure 10:
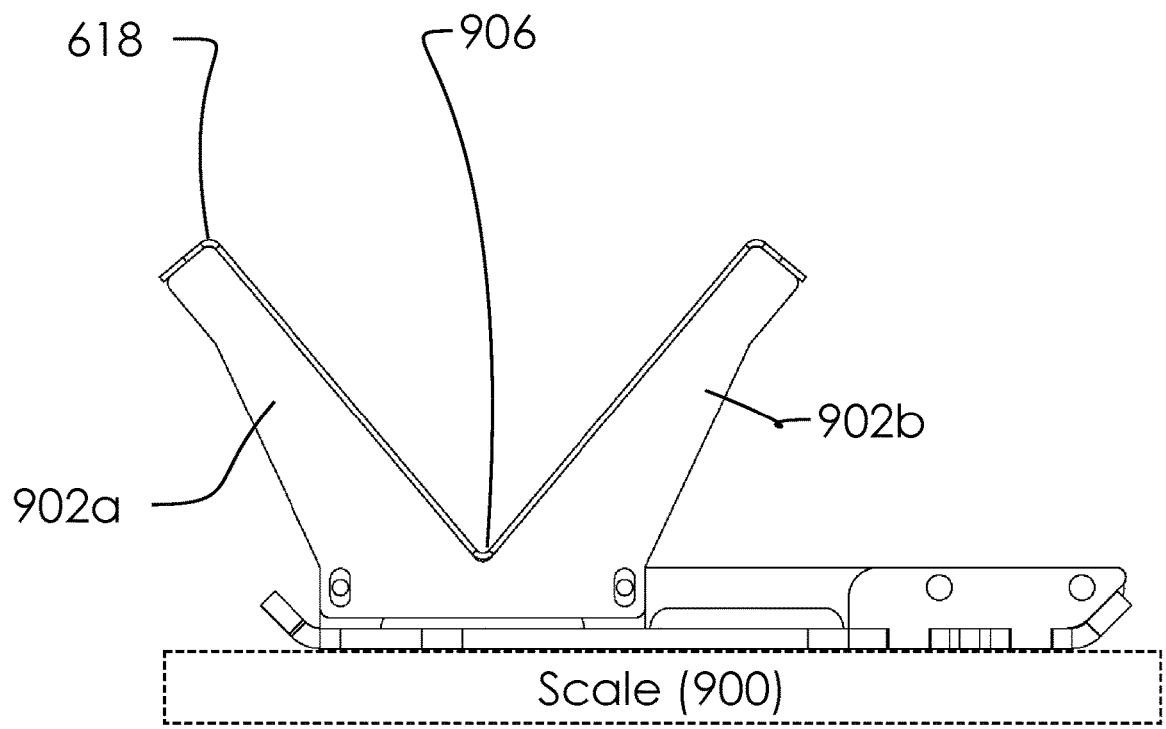
FIG. 10 illustrates an elevated front view of said tray 618.

FIG. 10 illustrates an elevated front view of said tray 618.

Figure 11A:
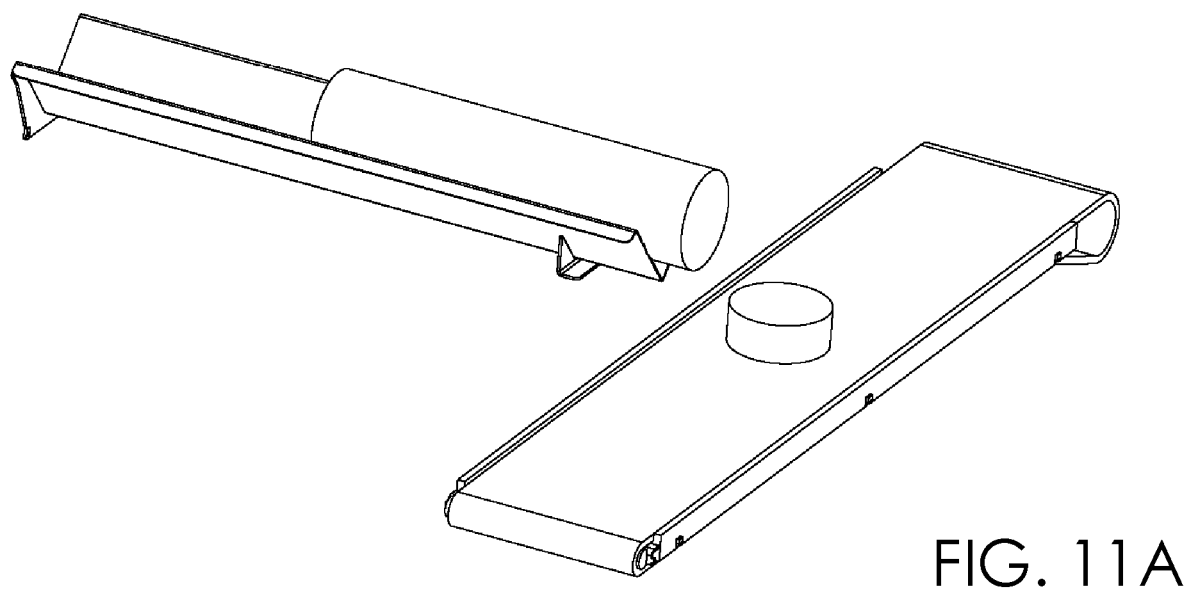
FIGS. 11A and 11B illustrate an overview and block diagram view of a back-side of said automated saw 600 with a cutting plane 1110 being calculated.
Figure 11B:
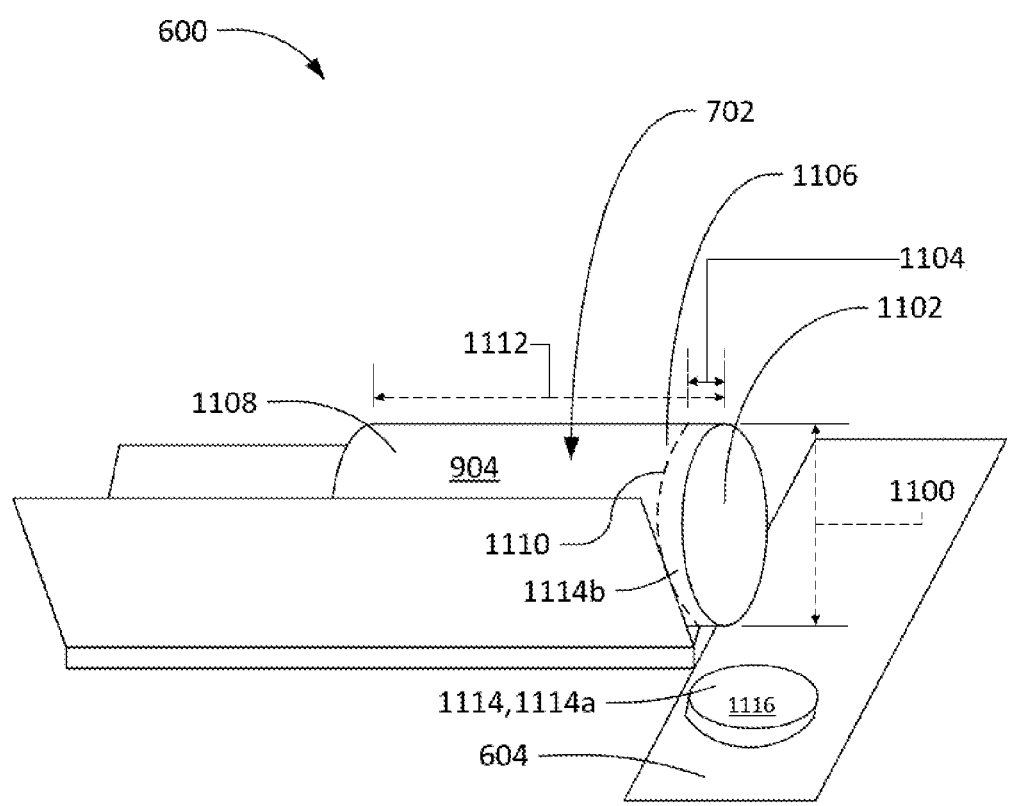

FIGS. 11A and 11B illustrate an overview and block diagram view of a back-side of said automated saw 600 with a cutting plane 1110 being calculated.

In one embodiment, said automated saw 600 can calculate a diameter 1100, a surface area 1102 and a cut depth 1104 of said uncut meat 702. As a starting point, said automated saw 600 can know an uncut meat length 1112, said diameter 1100 and said uncut meat weight 904 of said uncut meat 702. It can thereby calculate said cutting plane 1110 by using said surface area 1102 and said cut depth 1104 along with said uncut meat weight 904, said diameter 1100 and said uncut meat length 1112 to determine where to place said cutting plane 1110 to cut one or more cut portions 1114.

In one embodiment, said one or more cut portions 1114 can comprise at least a first cut portion 1114a and a second cut portion 1114b. Further, said one or more cut portions 1114 can comprise a cut portion weight 1116.

As illustrated, said automated saw 600 has already cut said first cut portion 1114a, and has calculated said uncut meat length 1112 from said uncut meat weight 904 and said uncut meat length 1112 by dividing the desired quantity of said cut portion weight 1116 for said second cut portion 1114b by said uncut meat weight 904, then taking that fraction and multiplying it by said uncut meat length 1112, the product of which comprises said cut depth 1104.

In another embodiment, said cut depth 1104 can be calculated by accounting for said surface area 1102 where said uncut meat 702 is not consistently the same width as said diameter 1100; wherein, said cut depth 1104 can be calculated by accounting for a volume and/or density of said uncut meat 702 along the entirety of said uncut meat length 1112.

Figure 12:
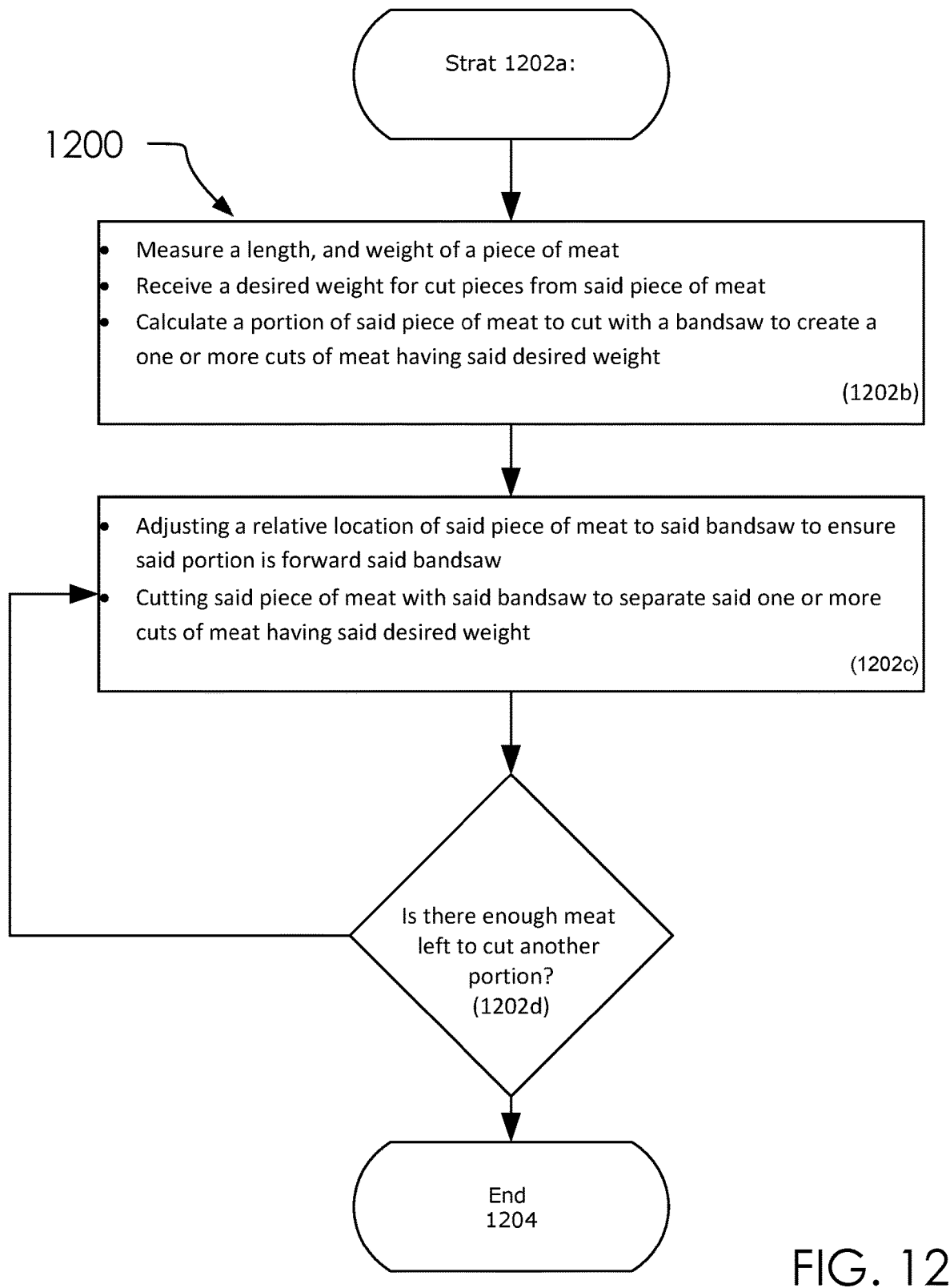
FIG. 12 illustrates a method of use 1200 of said automated saw 600.

FIG. 12 illustrates a method of use 1200 of said automated saw 600.

Said method of use 1200 can comprise a starting step 1202a, a calculation steps 1202b, an application steps 1202c and a status assessment step 1202d, as illustrated and discussed herein.

Said automated saw 600 for assessing said uncut meat 702 and calculating one or more of said cut depth 1104 and cutting said one or more cut portions 1114. Said automated saw 600 comprises said bandsaw blade 620, said controller 610, said visual sensor 612 and said meat positioning assembly 614. Said meat positioning assembly 614 comprises said pusher 616 and said tray 618 configured to move said uncut meat 702 relative to said bandsaw blade 620. Said tray 618 can be configured to hold said uncut meat 702. Said pusher 616 can be configured to slide said uncut meat 702 through said tray 618. Said meat positioning assembly 614 can be configured to move said tray 618 in said forward direction 708 and said rearward direction 706 relative to said bandsaw blade 620. Said uncut meat 702 comprises a first end 1106 and a second end 1108. Said first end 1106 of said uncut meat 702 comprises said surface area 1102 and said diameter 1100. Said uncut meat 702 comprises said uncut meat weight 904. Said one or more cut portions 1114 comprise at least said first cut portion 1114a of said uncut meat 702. Said controller 610 can be configured for calculating a fraction comprising said cut portion weight 1116 divided by said uncut meat weight 904 and multiplying said fraction with said uncut meat length 1112 to determine said cut depth 1104, activating said meat positioning assembly 614 to align said cutting plane 1110 at said cut depth 1104 from said first end 1106, cutting said first cut portion 1114a from said uncut meat 702 with said bandsaw blade 620, and repeating these steps as required to separate said one or more cut portions 1114 from said uncut meat 702.

Said automated saw 600 for assessing said uncut meat 702 and calculating one or more of said cut depth 1104 and cutting said one or more cut portions 1114. Said automated saw 600 comprises said bandsaw blade 620, said controller 610, said visual sensor 612 and said meat positioning assembly 614. Said meat positioning assembly 614 selectively pushes said uncut meat 702 relative to said bandsaw blade 620. Said meat positioning assembly 614 can be configured to move said tray 618 in said forward direction 708 and said rearward direction 706 relative to said bandsaw blade 620. Said uncut meat 702 comprises said first end 1106 and said second end 1108. Said first end 1106 of said uncut meat 702 comprises said surface area 1102 and said diameter 1100. Said uncut meat 702 comprises said uncut meat weight 904. Said one or more cut portions 1114 comprise at least said first cut portion 1114a of said uncut meat 702. Said controller 610 can be configured for calculating said cut depth 1104 of said uncut meat 702 in order to yield said cut portion weight 1116 being a desired cut portion of said uncut meat 702, activating said meat positioning assembly 614 to align said cutting plane 1110 at said cut depth 1104 from said first end 1106, cutting said first cut portion 1114a from said uncut meat 702 with said bandsaw blade 620 along said cutting plane 1110, and repeating these steps as required to separate said one or more cut portions 1114 from said uncut meat 702.

calculating said cut depth 1104 of said uncut meat 702 comprises calculating a fraction comprising said cut portion weight 1116 divided by said uncut meat weight 904 and multiplying said fraction with said uncut meat length 1112 to determine said cut depth 1104.

Said meat positioning assembly 614 comprises said pusher 616 and said tray 618 configured to move said uncut meat 702 relative to said bandsaw blade 620. Said tray 618 can be configured to hold said uncut meat 702. Said pusher 616 can be configured to slide said uncut meat 702 through said tray 618.

cutting said first cut portion 1114a from said uncut meat 702 with said bandsaw blade 620 along said cutting plane 1110 comprises pushing said uncut meat 702 with said pusher 616 to said cut depth 1104 being a distance equal to a depth of said first cut portion 1114a, and aligning said cutting plane 1110 with said cut depth 1104.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An automated saw for assessing an uncut meat and calculating one or more of a cut depth and cutting one or more cut portions, wherein:
    said automated saw comprises a bandsaw blade, a controller, a visual sensor and a meat positioning assembly;
    said controller comprises a computer comprising an address space, and a processor, a memory;
    said controller stores a device application in said memory and runs said device application on said processor;
    said meat positioning assembly comprises a pusher and a tray configured to move said uncut meat relative to said bandsaw blade;
    said tray is configured to hold said uncut meat;
    said pusher is configured to slide said uncut meat through said tray;
    said meat positioning assembly is configured to move said tray in a forward direction and a rearward direction relative to said bandsaw blade;
    said uncut meat comprises a first end and a second end;
    said first end of said uncut meat comprises a surface area and a diameter;
    said uncut meat comprises an uncut meat weight;
    said controller is configured, with said device application, for:
        assessing said uncut meat with said visual sensor and a scale,
        calculating a volume and density of said uncut meat along the entirety of an uncut meat length of said uncut meat,
        calculating, given weight of a desired cut portion, a fraction comprising said desired cut portion divided by said uncut meat weight,
        calculating a portion of said uncut meat comprising a volume associated with said fraction of said desired cut portion divided by said uncut meat weight,
        calculating a location for determine said cut depth,
        activating said meat positioning assembly to align a cutting plane at said cut depth from said first end, and
        cutting a portion from said uncut meat with said bandsaw blade.

2. The automated saw of claim 1, wherein:
said visual sensor comprises a camera.

3. The automated saw of claim 1, wherein:
said tray is configured to move in two or three axes as dictated by said controller.

4. The automated saw of claim 1, wherein:
said device application in said controller is configured for
    receiving signals from said visual sensor, said meat positioning assembly,
    determining movement of said meat positioning assembly, and
    operating of said bandsaw blade.

5. The automated saw of claim 1, wherein:
said automated saw comprises said scale;
said controller is configured to communicate with said scale to determine said uncut meat weight of said uncut meat at a given time; and
said controller is configured to calculate said uncut meat weight before and after cutting with said bandsaw blade.

6. The automated saw of claim 1, wherein:
said tray comprises a first side and a second side; and
said first side and said second side is arranged in a "V" shape with a lower join line forming a substantially straight line at the point they meet.

* * * * *